Jan. 27, 1931.  A. KÉGRESSE  1,790,098
RESILIENT TRACK WITH MOVABLE ELEMENTS
Original Filed Feb. 3, 1928
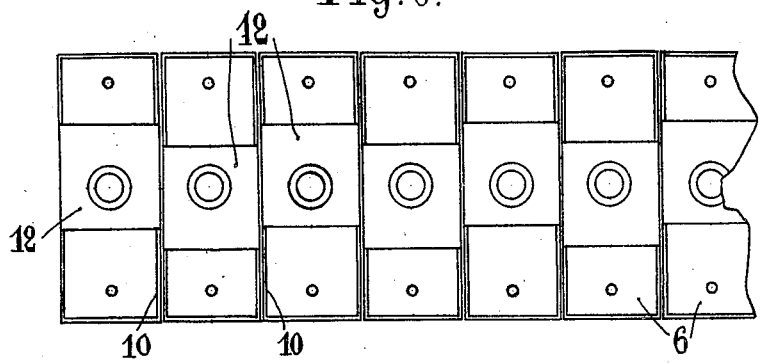
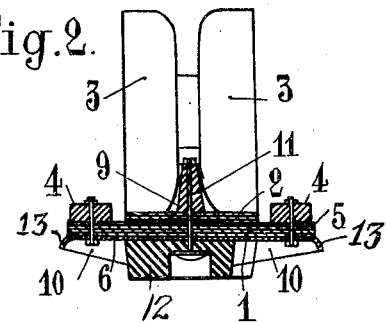
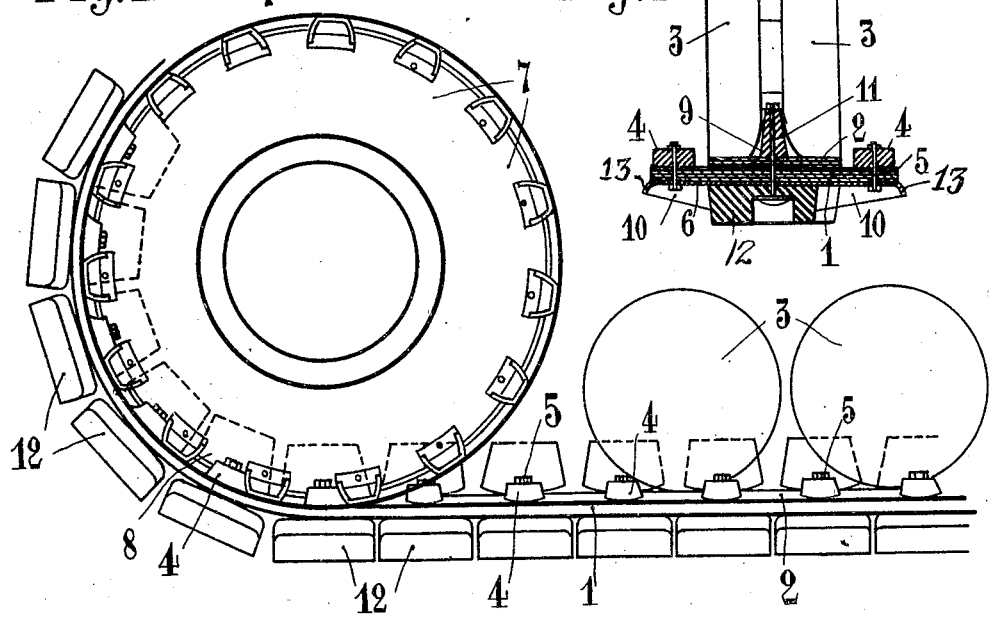
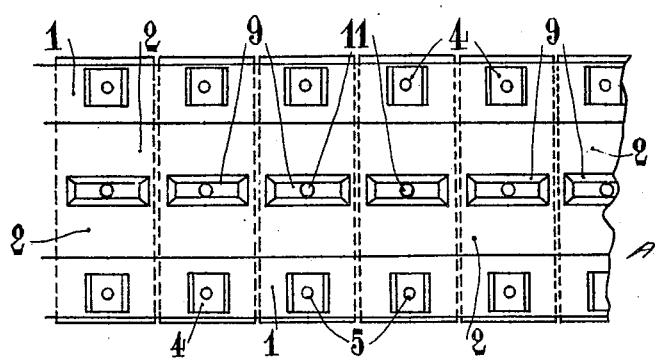
INVENTOR:
Adolphe Kégresse
BY
ATTORNEY Patented Jan. 27, 1931

1,790,098

UNITED STATES PATENT OFFICE

ADOLPHE KÉGRESSE, OF SURESNES, FRANCE

RESILIENT TRACK WITH MOVABLE ELEMENTS

Original application filed February 3, 1928, Serial No. 251,644, and in France February 9, 1927. Divided and this application filed May 10, 1929. Serial No. 362,046.

The present invention has reference to endless flexible track belts of the type in which a positive drive for the belt is employed; and it embodies certain improvements, hereinafter described, in or relating to the construction of the belt proper as well as to its driving system, the invention being essentially a division of that disclosed in my prior application No. 251,644, filed February 3, 1928, to which reference may be had for a more complete understanding.

In the accompanying drawings:

Figure 1 is a fragmental side view showing the mounting of a track belt constructed in accordance with this invention;

Fig. 2 is a transverse section thereof;

Fig. 3 is a fragmental outer plan view of the belt; and

Fig. 4 is a similar inner plan view.

Referring more particularly to the drawings, the core or body of the belt is constituted by an endless band or element 1, the two faces of which are flat; said band being made of suitable flexible material, such as leather, or rubberized canvas, or in the form of a flexible metal strip, or of cables which may or may not be embedded in rubber, or in any other way.

On the inner face of the band there is provided an extra thickness 2, serving as a trackway for the rollers 3 of the carrier train. This extra thickness, as is clearly shown in Fig. 2, does not extend over the whole width of the band 1 but is limited approximately to the width of the said rollers 3, so that a special treadway or track is thus obtained, the ultimate wear and tear of which will not affect the band itself.

The drive is effected in the same way as that disclosed in the above-identified parent case—i. e., by means of driving teeth or lugs provided on the band and designed to engage in seats formed in the periphery of the driving pulley, whereby the rotation of said pulley will be transmitted through the driving lugs and their seats to the band to exert a positive tractive effort thereon. In the form illustrated in the present case, the lugs or teeth 4 are constituted by small independent blocks made of suitable material, such as steel, wood, rubber, agglomerate, etc.; and they are secured to the band 1 by means of bolts 5 which pass through said band as well as through metal plates 6 hereinafter referred to, the heads of the bolts bearing against the plates (Fig. 2). The lugs are arranged in two rows which extend adjacent the opposite side edges of band 1, and the seats 7 wherein they are designed to engage are likewise arranged in rows formed along the opposite side edges of the peripheral surface of the driving pulley 8.

In addition to the parts described above, there is mounted on the band (more properly, along the median line of the roller trackway 2 thereof), for the entire length of the band, a series of blocks 9 which coact with the carrier rollers 3 to guide the band during its movements. The metal plates 6 previously mentioned are arranged transversely on the outer or ground-engaging face of the band, adjacent to and almost contacting with one another, and they carry ribs 10 which impart the requisite resistance thereto and which can also do duty as grippers on soft ground. Two of the driving lugs or teeth 4 are secured to each plate at opposite sides of the respective guide block 9; and in the same straight line with the lugs there is also arranged the bolt 11 which removably fastens the guide blocks and the plates to the band 1, such line being parallel to the axes of the carrier rolls 3.

Finally, elastic shoes 12, made of suitable material, are set in between the plate ribs 10; these shoes virtually contacting with each other lengthwise the band and conjointly forming a continuous ground tread for travel on roads and other hard ground. In order to insure better ground grip, the shoes may be arranged in slightly staggered relation (Fig. 3), without such arrangement interfering with the continuity of the tread; and said shoes are removably fastened to the endless band 1 and the plates 6 by the same bolts 11 that secure the guide blocks 9 thereto, so that there is, therefore, on said band, an equal number of blocks, plates, shoes and assembly bolts.

The plates 6, as shown in Fig. 2, are provided at their opposite ends with flanges 13 which are curved slightly outward in a direction away from the band 1, so that there is no danger of the flanges rubbing against the edges of the band 1 while the latter is passing around the driving and supporting pulleys. Such rubbing, as will be understood, tends to produce wear on the band edges, leaving spaces into which particles of dirt and other extraneous materials may enter; these particles exerting a damaging influence on the band, so that the avoidance of wear on the band edges is, therefore, a matter of importance.

I claim as my invention:—

1. An endless track belt comprising an endless flexible band having on its inner surface an extra thickness arranged along its median portion and of a width substantially less than that of the band itself so as to provide a continuous trackway the opposite longitudinal edges of which are appreciably spaced from the band edges; a series of metal plates secured transversely to the outer surface of the band; and two rows of driving lugs applied directly to the said inner surface of the band outside the longitudinal edges of said trackway and secured to said band and to the plates.

2. An endless track belt comprising an endless flexible band having on its inner surface an extra thickness arranged along its median portion and of a width substantially less than that of the band itself so as to provide a continuous trackway the opposite edges of which are appreciably spaced from the band edges; a series of metal plates secured transversely to the outer surface of the band with their side edges in virtual abutting relation; a longitudinal series of guide blocks disposed on the inner surface of said band along its median line; a longitudinal series of elastic shoes disposed against the outer surface of the band directly opposite the guide blocks; and bolts passing through the band, guide blocks, shoes and plates for removably securing them together.

3. An endless track belt according to claim 2, in which the plates have their ends projecting beyond the side edges of the band and curved in a direction away from the band.

In testimony whereof I affix my signature.

ADOLPHE KÉGRESSE.